United States Patent
An et al.

(10) Patent No.: US 9,434,353 B2
(45) Date of Patent: Sep. 6, 2016

(54) FLAT WIPER BLADE

(71) Applicant: KBWS CORPORATION, Daegu (KR)

(72) Inventors: Jae-Hyuck An, Daegu (KR); Jin-Wan Park, Daegu (KR)

(73) Assignee: KBWS Corporation, Daegu (KR)

( * ) Notice: Subject to any disclaimer, the term of this patent is extended or adjusted under 35 U.S.C. 154(b) by 94 days.

(21) Appl. No.: 14/300,031

(22) Filed: Jun. 9, 2014

(65) Prior Publication Data

US 2014/0359963 A1    Dec. 11, 2014

(30) Foreign Application Priority Data

Jun. 10, 2013  (KR) .......................... 10-2013-0065644

(51) Int. Cl.
*B60S 1/38* (2006.01)
*B60S 1/40* (2006.01)

(52) U.S. Cl.
CPC .............. *B60S 1/381* (2013.01); *B60S 1/3849* (2013.01); *B60S 1/3858* (2013.01)

(58) Field of Classification Search
CPC .... B60S 1/381; B60S 1/3858; B60S 1/3881; B60S 1/3896; B60S 1/0408; B60S 1/3849
USPC .......................... 15/250.32, 250.201, 250.43
See application file for complete search history.

(56) References Cited

U.S. PATENT DOCUMENTS

2004/0111820 A1*  6/2004  Aoyama .................. B60S 1/381
                                                                    15/250.201

FOREIGN PATENT DOCUMENTS

| CN | 20110112794 A | 10/2011 |
| KR | 1020090042785 A | 4/2009 |
| WO | WO 2012/033363 A2 | 3/2012 |

OTHER PUBLICATIONS

Office Action for Chinese Patent Application No. CN 201410247170.X, Oct. 9, 2015, 5 Pages (With Concise Explanation of Relevance).

\* cited by examiner

*Primary Examiner* — Gary Graham
(74) *Attorney, Agent, or Firm* — Fenwick & West LLP

(57) ABSTRACT

A flat wiper blade may be provided that includes: a wiper strip 10 which wipes a wiping surface; a guide spring 30 which supports the wiper strip 10; a first spoiler 41 and a second spoiler 42 which are coupled to the guide spring 30 and include at least one catching part 45; and a seating part 100 which is coupled to the guide spring 30 in an attachable and removable manner. The seating part 100 includes at least one catching recess 145 which corresponds to the catching part 45. The catching recess 145 is coupled to the catching part 45. When a curvature is formed in the flat wiper blade, the first and second spoilers 41 and 42 become farther away from the seating part 100 in the longitudinal direction thereof.

6 Claims, 7 Drawing Sheets

FLAT WIPER BLADE

CROSS-REFERENCE TO RELATED APPLICATION

The present application claims priority under 35 U.S.C. §119(e) of Korean Patent Application No. 10-2013-0065644 filed Jun. 10, 2013, which is incorporated by reference herein in its entirety.

BACKGROUND

1. Field

Embodiments may relate to a flat wiper blade.

2. Description of Related Art

In general, a wiper blade removes impurities, snow, rain or the like when driving and prevents a driver's front sight from being deteriorated. As a motor drives a link apparatus connected to a wiper arm, the wiper blade performs a repetitive reciprocating action in a fan shape.

The wiper blade includes a long wiper strip in contact with a glass surface and a guide spring which maintains and supports the wiper strip in a longitudinal direction of the wiper strip. The wiper blade including the guide spring is known as a "conventional" wiper blade in the art. Recently, a wiper blade is being employed which makes use of one guide spring curved at a predetermined curvature and formed in the form of a long thin bar. Such a wiper blade is known as a flat wiper blade or a flat-bar wiper blade in the art.

As compared with the "conventional" wiper blade, the flat wiper blade has a less height and receives less air resistance. With a uniform load, the flat wiper blade is also able to cause the wiper strip to contact with the glass surface. A flat wiper blade assembly including the flat wiper blade includes an adaptor disposed in the central portion of the guide spring. The flat wiper blade assembly is connected to a wiper arm such that the adaptor is separably connected to the end portion of the wiper arm.

When a curvature is formed in the existing flat wiper blade, a gap is created between a spoiler and the adaptor. In the existing flat wiper blade, the gap formed between the spoiler and the adaptor is contaminated by the impurities. Also, the existing flat wiper blade fixedly connects the spoiler, the adaptor and the guide spring. When the curvature is formed in such a flat wiper blade, the wiper strip separates from the spoiler. The separated wiper strip is contaminated by the impurities.

Therefore, research is required to develop a flat wiper blade in which a gap is not created between the spoiler and the adaptor when the curvature is formed in the flat wiper blade. Also, research is required to develop a flat wiper blade in which the wiper strip is not separated when the curvature is formed in the flat wiper blade.

SUMMARY

One embodiment is a flat wiper blade that includes: a wiper strip 10 which wipes a wiping surface; a guide spring 30 which supports the wiper strip 10; a first spoiler 41 and a second spoiler 42 which are coupled to the guide spring 30 and include at least one catching part 45; and a seating part 100 which is coupled to the guide spring 30 in an attachable and removable manner. The seating part 100 includes at least one catching recess 145 which corresponds to the catching part 45. The catching recess 145 is coupled to the catching part 45. When a curvature is formed in the flat wiper blade, the first and second spoilers 41 and 42 become farther away from the seating part 100 in the longitudinal direction thereof.

The catching part 45 may include a first part 47 and a second part 48, and a length L1 of the catching recess 145 may be greater than a length L2 of the second part 48.

An end of the guide spring 30 may be inserted and fixed to a hole 43 formed in the first and second spoilers 41 and 42.

The guide spring 30 may include a first rail spring 31 and a second rail spring 32.

The seating part 100 may include an adaptor 3.

The seating part 100 may include a protrusion 133. The guide spring 30 may include a fitting recess 33. The protrusion 133 may be coupled to the fitting recess 33.

BRIEF DESCRIPTION OF THE DRAWINGS

Arrangements and embodiments may be described in detail with reference to the following drawings in which like reference numerals refer to like elements and wherein.

DETAILED DESCRIPTION

A thickness or a size of each layer may be magnified, omitted or schematically shown for the purpose of convenience and clearness of description. The size of each component may not necessarily mean its actual size.

It should be understood that when an element is referred to as being 'on' or "under" another element, it may be directly on/under the element, and/or one or more intervening elements may also be present. When an element is referred to as being 'on' or 'under', 'under the element' as well as 'on the element' may be included based on the element.

An embodiment may be described in detail with reference to the accompanying drawings.

An embodiment of the present invention will be described in detail with reference to the accompanying drawings. In the components of the present invention, detailed descriptions of what can be clearly understood and easily carried into practice through a prior art by those skilled in the art will be omitted to avoid making the subject matter of the present invention unclear.

Embodiment

Figure 1:
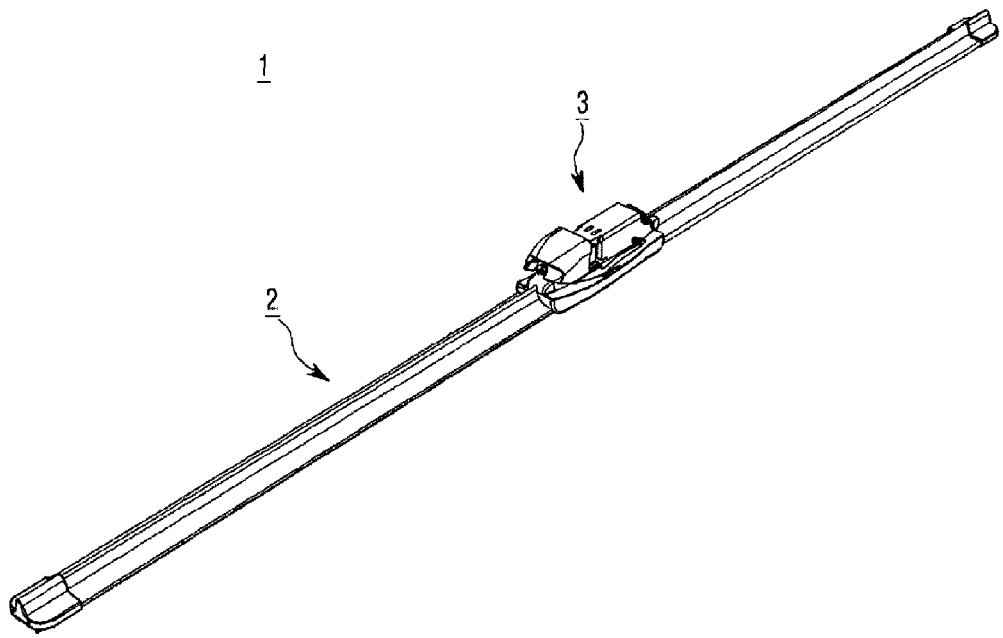
FIG. 1 is a perspective view showing an overall configuration of a flat wiper blade assembly according to an embodiment of the present invention.
Figure 2:
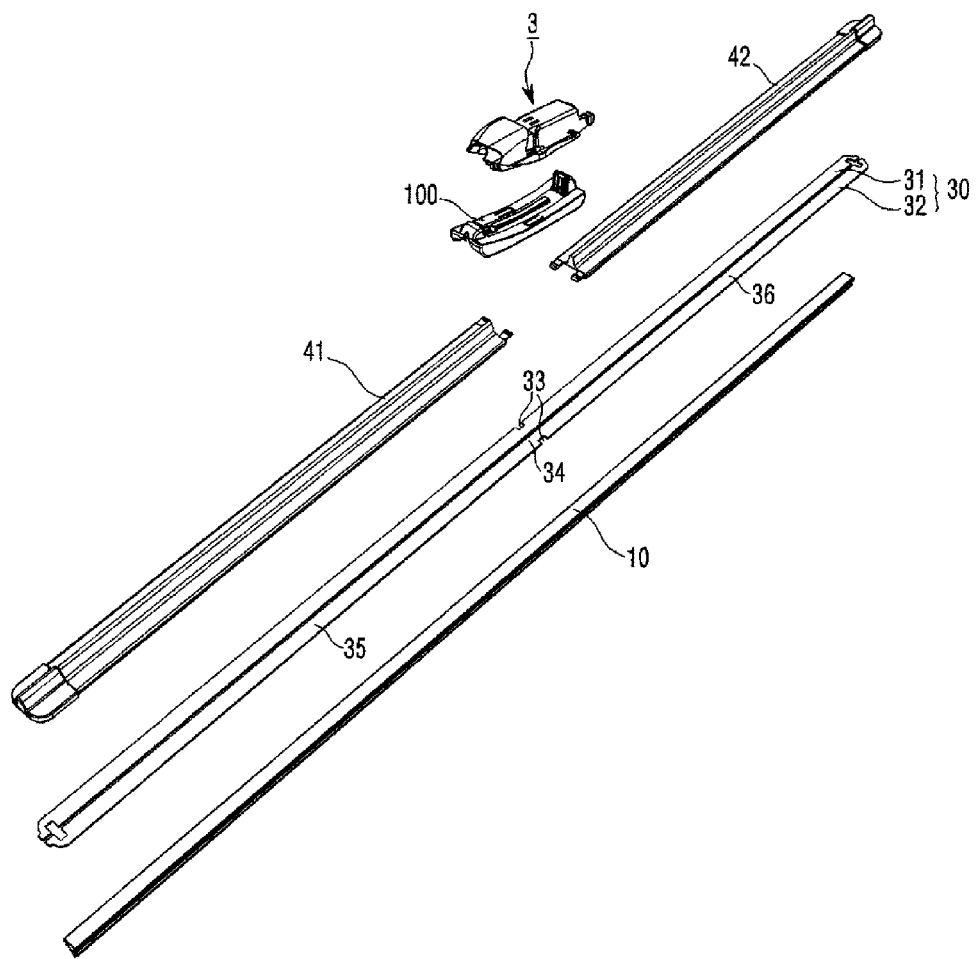
FIG. 2 is an exploded perspective view showing that the flat wiper blade assembly of FIG. 1 has been disassembled.
Figure 3:
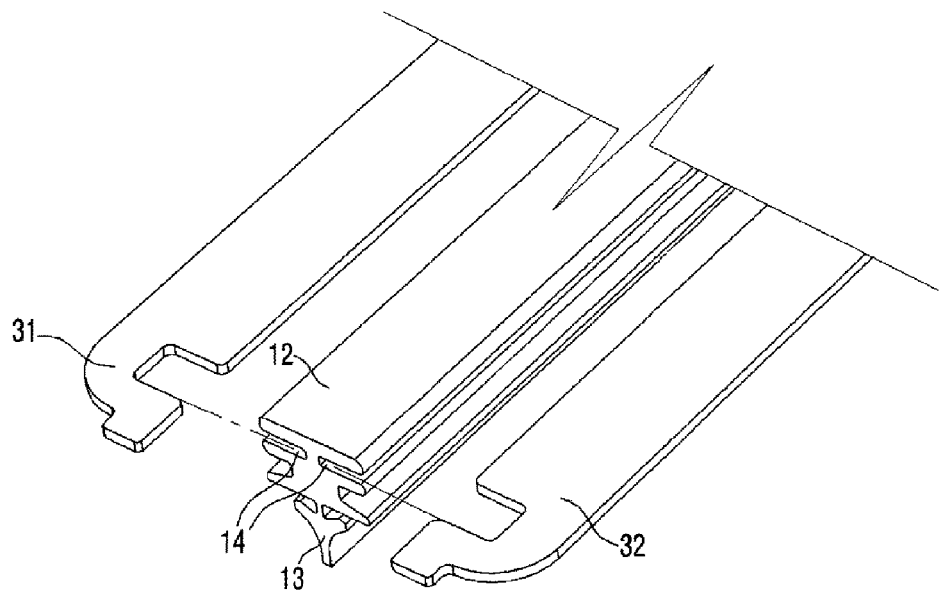
FIG. 3 is a perspective view showing an end of a wiper strip of FIG. 2.

FIG. 1 is a perspective view showing an overall configuration of a flat wiper blade assembly according to an embodiment of the present invention. FIG. 2 is an exploded perspective view showing that the flat wiper blade assembly of FIG. 1 has been disassembled. FIG. 3 is a perspective view showing an end of a wiper strip of FIG. 2.

As shown in FIG. 1, the flat wiper blade assembly 1 according to the present invention includes a flat wiper blade 2 which contacts closely with a glass surface of the vehicle, and an adaptor 3 which is assembled to the central portion of the flat wiper blade 2 so as to connect the flat wiper blade 2 with a wiper arm (not shown).

As shown in FIGS. 1 and 2, the flat wiper blade 2 includes a wiper strip 10 which contacts closely with and wipes the glass surface of the vehicle, a guide spring 30 which is disposed on both sides of the wiper strip 10 and supports the wiper strip 10, a first spoiler 41 and a second spoiler 42 which are coupled to the guide spring 30, and a seating part 100 for coupling the adaptor 3 to the guide spring 30.

Here, although the foregoing has described that the separate adaptor 3 which is distinguished from the seating part 100 is included, the present invention is not necessarily limited to this. Therefore, the seating part 100 and the adaptor 3 may be integrally formed with each other. That is, the seating part 100 may include the adaptor 3.

Hereafter, the flat wiper blade 2 will be described in detail.

The flat wiper blade 2 is connected to the front end of the wiper arm and receives a pressing force from the wiper arm with respect to the glass surface of the vehicle. The wiper arm rotates reciprocatively at a predetermined angle by a wiper motor (not shown). Accordingly, the flat wiper blade 2 wipes the glass surface (wiping surface) of the vehicle within the predetermined angle.

As shown in FIGS. 2 and 3, the wiper strip 10 extends in a longitudinal direction thereof and is made of an elastic material like a rubber material or made of an elastic composite material. The wiper strip 10 is disposed to contact with the glass of the vehicle in a sliding manner and removes impurities of the glass surface.

The wiper strip 10 includes a base 12 and a wiper lip 13 which is disposed under the base 12 and directly contacts with and wipes the glass surface. Also, the guide spring 30 includes a first rail spring 31 and a second rail spring 32.

The base 12 has a receiving recess 14 formed therein in which the first and second rail springs 31 and 32 in parallel with each other in the longitudinal direction thereof are received. The first and second rail springs 31 and 32 are received in the two receiving recesses 14 respectively.

The base 12 and the wiping lip 13 continuously extend in the longitudinal direction of the wiper strip 10.

The wiper strip 10 and the first and second rail springs 31 and 32 have a long thin shape in the major axial direction of the flat wiper blade 2. The first and second rail springs 31 and 32 are received through the receiving recess 14.

Here, although the foregoing has described that the guide spring 30 is comprised of the first and second rail springs 31 and 32, the guide spring 30 of the present invention is not limited to this. The guide spring 30 may consist of a single member.

The guide spring 30 includes a first and a second side portions 35 and 36 which are located on both ends thereof and a central portion 34 located approximately in the center between the first and second side portions 35 and 36. The first and second spoilers 41 and 42 are coupled to the first and second side portions 35 and 36 respectively. The seating part 100 is coupled to the central portion 34, and the adaptor 3 is coupled to the seating part 100.

A fitting recess 33 is formed in a portion of the longitudinal direction side of the guide spring 30 in such a manner as to be concave in the width direction of the flat wiper blade 2. The fitting recess 33 is located approximately in the central portion of the guide spring 30.

The guide spring 30 applies elasticity and rigidity to the wiping lip 13. When a pressurizing force is applied from the wiper arm, the pressurizing force is distributed to the wiper strip 10 through the guide spring 30. Here, the pressurizing force is distributed by the guide spring 30 in the longitudinal direction of the wiper strip 10. Accordingly, the guide spring 30 should have elasticity, and rigidity to maintain the shape of the wiper strip 10.

Hereafter, the following description will focus on how the first and second rail springs 31 and 32 are coupled to the spoiler.

Figure 4:
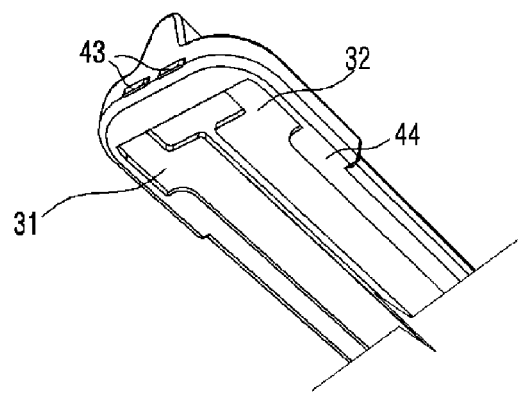
FIG. 4 is a perspective view showing that a first and a second rail springs of FIG. 2 have been coupled to a spoiler of FIG. 2.

FIG. 4 is a perspective view showing that the first and second rail springs of FIG. 2 have been coupled to the spoiler of FIG. 2.

Figure 5:
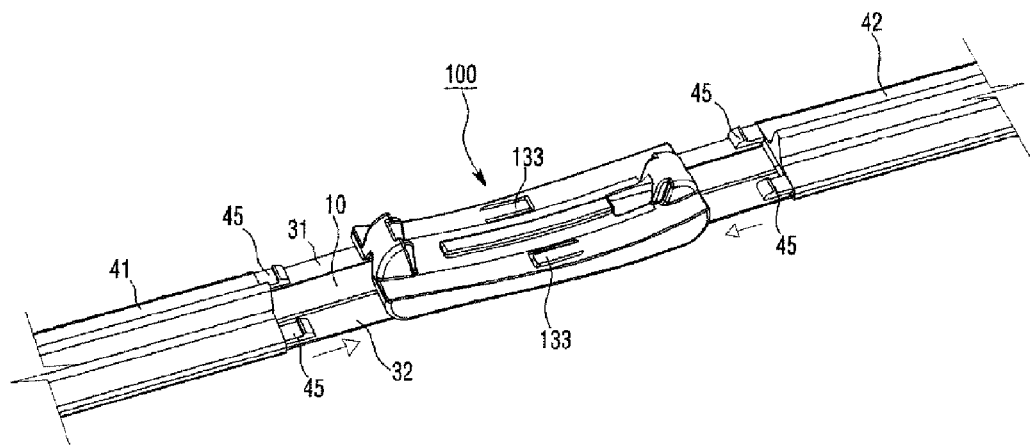
FIG. 5 is a perspective view showing that a seating part of FIG. 2 has been coupled to the first and second spoilers of FIG. 2.

Referring to FIG. 4, the spoiler may be the first spoiler 41 or the second spoiler 42 shown in FIG. 2. The spoiler has a cross section having an inclined top surface, and functions to prevent the wiper from lifting when driving. The spoiler includes a guide receiver 44 and a catching part 45 which is, as shown in FIG. 5, formed on one end of the spoiler.

The guide receiver 44 is formed in the shape of a rail in the inner surface of the spoiler. The guide receiver 44 may guide and receive the first and second rail springs 31 and 32. Here, it means that the first and second rail springs 31 and 32 are guided by the rail-shaped guide receiver 44 and inserted into the spoiler.

The guide receiver 44 receives and is coupled to the first and second rail springs 31 and 32 in the form of surrounding the first and second rail springs 31 and 32. Therefore, the first and second rail springs 31 and 32 are fixed to the spoiler.

Further, at least one hole 43 is formed in the other end of the spoiler. One ends of the first and second rail springs 31 and 32 are inserted and fixed to the holes 43 respectively. Here, the hole 43 has a through shape and a shape having only one concave side.

Accordingly, even though a curvature is formed in the guide spring 30, the first and second rail springs 31 and 32 do not protrude outwardly from the end of the spoiler.

Hereafter, the seating part 100 and the first and second spoilers 41 and 42 will be described in detail.

Figure 6:
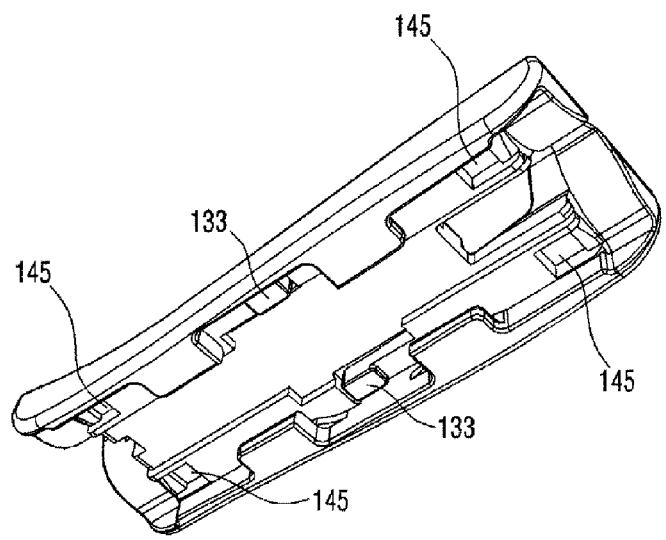
FIG. 6 is a perspective view showing the bottom surface of the seating part of FIG. 5.

FIG. 5 is a perspective view showing that the seating part of FIG. 2 has been coupled to the first and second spoilers of FIG. 2. FIG. 6 is a perspective view showing the bottom surface of the seating part of FIG. 5.

Referring to FIGS. 5 and 6, the seating part 100 may include a protrusion 133 formed in a position corresponding to the fitting recess 33 shown in FIG. 2. A catching recess 145 may be formed at a lower corner of the seating part 100. Also, the first and second spoilers 41 and 42 include the catching part 45 corresponding to the catching recess 145.

The protrusion 133 is fastened to the guide spring 30 of FIG. 2. The protrusion 133 may be inserted and fixed downward to the fitting recess 33. The seating part 100 may be fixed to the guide spring 30. The number of the protrusions 133 may correspond to the number of the fitting recesses 33 of the guide spring 30. The shape of the protrusion 133 may correspond to the shape of the fitting recess 33.

The catching recess 145 is coupled to the catching parts 45 of the first and second spoilers 41 and 42 in such a manner that the catching part 45 is inserted and fixed to the seating part 100. The number of the catching recesses 145 may correspond to the number of the catching parts 45.

Hereafter, the catching part 45 of the first and second spoilers 41 and 42 will be described in detail.

Figure 7A:
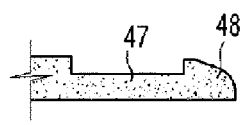
FIGS. 7a and 7b show several examples of a catching part shown in FIG. 5.
Figure 7B:
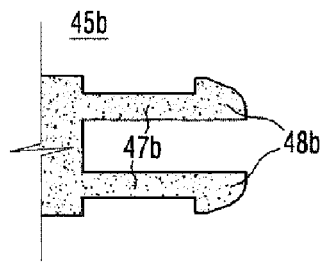

FIGS. 7a and 7b show several examples of a catching part shown in FIG. 5.

Specifically, FIG. 7a is a side view of the catching part 45 shown in FIG. 5. Also, FIG. 7b is a top view of a catching part 45b having a different shape from that of the catching part 45a.

Referring to FIGS. 5 to 7a, the catching part 45 of FIG. 7a includes a first part 47 which extends from the end of the first and second spoilers 41 and 42 in the longitudinal direction of the spoiler, and a second part 48 which is continuously formed with the first part 47 and has a shape corresponding to the shape of the catching recess 145.

Further, the catching part 45b of FIG. 7b, which has a different shape from the above described shape, includes a first part 47b which extends from the end of the first and second spoilers 41 and 42 in the longitudinal direction of the spoiler, and a second part 48b which is continuously formed with the first part 47b and has a shape protruding in the width direction of the spoiler.

Here, the catching recess 145 may be changed according to the shapes of the catching parts 45 and 45b.

Figure 8:
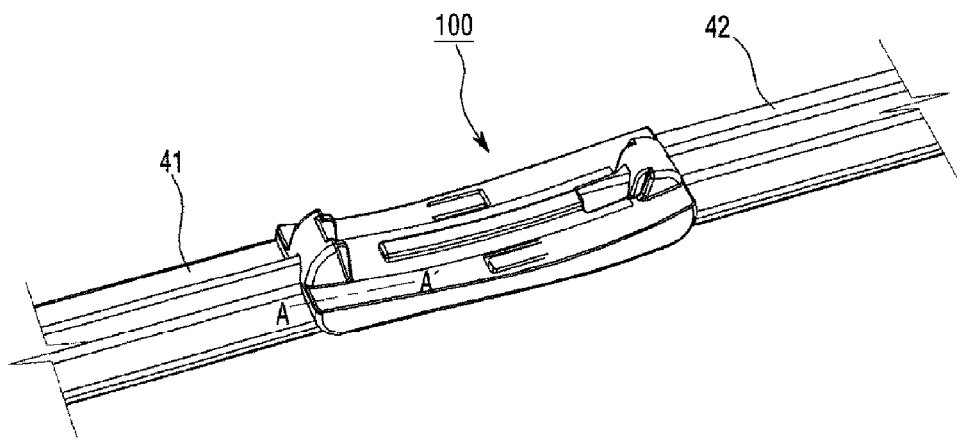
FIG. 8 is a perspective view showing that the seating part of FIG. 5 has been coupled to the first and second spoilers of FIG. 5.

The detailed description of the connection of catching part 45 and the catching recess 145 will be provided with reference to FIGS. 8 and 9.

Figure 9A:
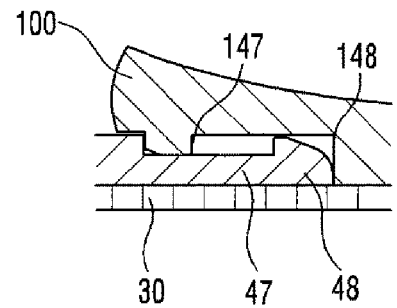
FIGS. 9a and 9b are cross sectional views taken along line A-A' of FIG. 8.
Figure 9B:
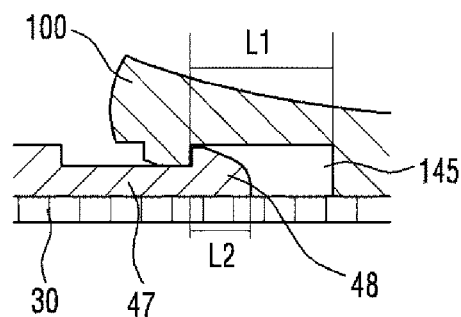

FIG. 8 is a perspective view showing that the seating part of FIG. 5 has been coupled to the first and second spoilers of FIG. 5. FIGS. 9a and 9b are cross sectional views taken along line A-A' of FIG. 8.

Referring to FIG. 8, the seating part 100 is disposed between the first spoiler 41 and the second spoiler 42. Also, though not shown in FIG. 8, the guide spring 30 is disposed under the seating part 100 and the first and second spoilers 41 and 42. The seating part 100 and the first and second spoilers 41 and 42 are coupled to each other by the catching recess 145 and the catching part 45.

Specifically, how the catching recess 145 and the catching part 45 are coupled to each other will be described with reference to FIGS. 9a and 9b. First, the first and second spoilers 41 and 42 and the seating part 100 are disposed as shown in FIG. 9a. Specifically, the catching parts 45 of the first and second spoilers 41 and 42 are disposed on the guide spring 30, and the catching recess 145 is disposed on the catching part 45. The second part 48 of the catching part 45 may come in contact with a second surface 148 of the catching recess 145.

Here, in FIG. 9a, the curvature may not be formed in the flat wiper blade.

Further, the first and second spoilers 41 and 42 and the seating part 100 are disposed as shown in FIG. 9b. Specifically, the second part 48 of the catching part 45 may come in contact with a first surface 147 of the catching recess 145 of the seating part 100.

Here, in FIG. 9b, the curvature may be formed in the flat wiper blade. Also, a length L1 of the catching recess 145 formed in the longitudinal direction of the seating part 100 is greater than a length L2 of the second part of the catching part 45 formed in the longitudinal direction of the first and second spoilers 41 and 42. Here, the length L1 of the catching recess 145 corresponds to a distance between the first surface 147 and the second surface 148.

Hereafter, the curvature change of the flat wiper blade will be described in detail.

Figure 10A:
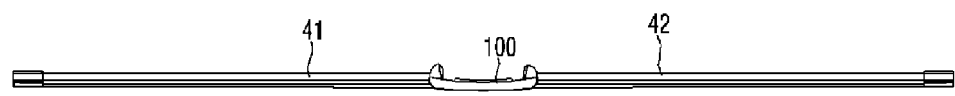
FIGS. 10a and 10b are side views for describing change of curvature of the flat wiper blade of the present invention.
Figure 10B:
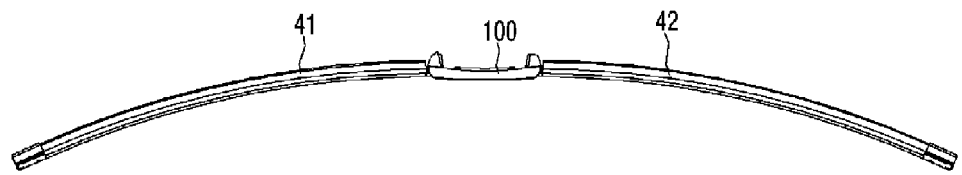

FIGS. 10a and 10b are side views for describing change of curvature of the flat wiper blade of the present invention. Here, the wiper strip of the flat wiper blade is not shown for convenience of description and better understanding of the present invention.

FIG. 10a shows that the curvature has not been formed in the flat wiper blade. Here, as described in FIG. 8a, the catching part 45 may come in contact with the second surface 148. Also, the first spoiler 41 is in contact with the seating part 100.

Here, as shown in FIG. 10b, when the curvature is formed in the flat wiper blade, the first spoiler 41 is shifted farther away from the seating part 100 as much as the maximum L1-L2 of FIG. 9b in the longitudinal direction thereof.

Here, although only the first spoiler 41 has been described in FIGS. 10a and 10b, this is for convenience of description and better understanding of the present invention. The present invention is not limited to this. The second spoiler 42 may be the same as the first spoiler 41 with the exception of the fact that the second spoiler 42 is shifted in a direction different from the direction in which the first spoiler 41 is shifted.

As such, when the curvature is formed in the flat wiper blade of the present invention, there is an advantage in that a gap is not created between the first spoiler 41 and the seating part 100. Also, since the first spoiler 41 is shifted as much as the maximum L1-L2 of FIG. 9b due to the curvature of the flat wiper blade of the present invention, the wiper strip is not separated away to the outside.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present invention were described above, these are just examples and do not limit the present invention. Further, the present invention may be changed and modified in various ways, without departing from the essential features of the present invention, by those skilled in the art. That is, the components described in detail in the embodiments of the present invention may be modified. Further, differences due to the modification and application should be construed as being included in the scope and spirit of the present invention, which is described in the accompanying claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A flat wiper blade comprising:
   a wiper strip configured to wipe a wiping surface;
   a guide spring which supports the wiper strip;
   a first spoiler and a second spoiler which are coupled to the guide spring, wherein each of the first and the second spoilers comprises at least two catching parts; and
   a seating part which is coupled to the guide spring in an attachable and removable manner,
   wherein the seating part comprises at least two catching recesses each of the at least two catching recesses corresponding to each of the catching parts,
   wherein each of the at least two catching recesses is inwardly concaved at a lower portion of the seating part,
   wherein each of the catching parts comprises a first part extending from an end of one of the first and second spoilers, and a second part continuing from each of the first part and having a shape that corresponds to a shape of each of the at least two catching recesses,
   wherein each of the at least two catching recesses is coupled to the catching part,
   wherein, when the flat wiper blade is bent, the first and second spoilers move away in a longitudinal direction of the first and second spoilers from the seating part, and
   wherein an upper portion of the second part of each of the catching parts is blocked by the seating part when each of the catching parts engages the seating part.

2. The flat wiper blade of claim 1, wherein a length of each of the catching recesses is greater than a length of a corresponding second part.

3. The flat wiper blade of claim 1, wherein an end of the guide spring is inserted and fixed to a hole formed in each of the first and second spoilers.

4. The flat wiper blade of claim 1, wherein the guide spring comprises a first rail spring and a second rail spring.

5. The flat wiper blade of claim 1, wherein the seating part comprises an adaptor.

6. The flat wiper blade of claim 1,
   wherein the seating part comprises a protrusion,
   wherein the guide spring comprises a fitting recess,
   and wherein the protrusion is coupled to the fitting recess.

* * * * *